US007460705B2

(12) United States Patent
Nagahashi et al.

(10) Patent No.: US 7,460,705 B2
(45) Date of Patent: Dec. 2, 2008

(54) HEAD-TOP DETECTING METHOD, HEAD-TOP DETECTING SYSTEM AND A HEAD-TOP DETECTING PROGRAM FOR A HUMAN FACE

(75) Inventors: Toshinori Nagahashi, Tatsuno-machi (JP); Takashi Hyuga, Suwa (JP)

(73) Assignee: Seiko Epson Corporation (JP)

( * ) Notice: Subject to any disclaimer, the term of this patent is extended or adjusted under 35 U.S.C. 154(b) by 789 days.

(21) Appl. No.: 11/004,649

(22) Filed: Dec. 3, 2004

(65) Prior Publication Data
US 2005/0147304 A1 Jul. 7, 2005

(30) Foreign Application Priority Data
Dec. 5, 2003 (JP) ............... 2003-407912

(51) Int. Cl.
*G06K 9/00* (2006.01)
(52) U.S. Cl. .................................... 382/165
(58) Field of Classification Search ................. 382/103, 382/115, 118, 173; 348/77–78, 169, 208.14
See application file for complete search history.

(56) References Cited

U.S. PATENT DOCUMENTS

| 5,355,163 | A | * | 10/1994 | Tomitaka | 348/234 |
| 5,430,809 | A | * | 7/1995 | Tomitaka | 382/173 |
| 5,812,193 | A | * | 9/1998 | Tomitaka et al. | 348/369 |
| 7,324,669 | B2 | * | 1/2008 | Nakanishi et al. | 382/118 |

FOREIGN PATENT DOCUMENTS

| JP | 08-077334 | 3/1996 |
| JP | 09-006964 | 1/1997 |
| JP | 09-050528 | 2/1997 |
| JP | 2003-330097 | 11/2003 |

OTHER PUBLICATIONS

Communication from Japanese Patent Office re: counterpart application.

* cited by examiner

*Primary Examiner*—Jose L Couso
(74) *Attorney, Agent, or Firm*—Harness, Dickey & Pierce, P.L.C.

(57) ABSTRACT

A head-top detecting method is provided for detecting a head-top of a human face from an image with the human face included therein. After detecting a human face and setting a head-top detecting window at an upper part of the image, an image feature quantity within the head-top detecting window is calculated in a vertical direction and a location in which the image feature quantity changes with a threshold value or more is identified as the head-top of the human face. Thereby the head-top of a human face can be detected accurately and quickly.

3 Claims, 8 Drawing Sheets

HEAD-TOP DETECTING METHOD, HEAD-TOP DETECTING SYSTEM AND A HEAD-TOP DETECTING PROGRAM FOR A HUMAN FACE

RELATED APPLICATIONS

This application claims priority to Japanese Patent Application No. 2003-407912 filed Dec. 5, 2003 which is hereby expressly incorporated by reference herein in its entirety.

BACKGROUND

1. Technical Field

The present invention concerns pattern recognition and object recognition technologies, and more specifically, the invention relates to a head-top detecting method, a head-top detecting system and a head-top detecting program for accurately detecting the head-top of a human face from an image of the human face.

2. Related Art

With recent advancements of pattern recognition technologies and information processors such as computers, the recognition accuracy of text and sound has been dramatically improved. However, in the pattern recognition of an image of a human, an object, the landscape and so on, e.g., an image scanned from a digital still camera or the like, it is still difficult to accurately and quickly identify whether a human face is visible in the image or not.

However, automatically and accurately identifying whether a human face is visible in the image or not (with a computer) and who the human is has been extremely important to establish a living body recognition process, improve security, accelerate criminal investigations, speed up image data reduction and retrieval and so on. In this regard, many proposals have been made.

In JP-A-9-50528, the existence of a flesh color area is first determined in an input image, and the mosaic size is automatically determined in the flesh color area to convert a candidate area into a mosaic pattern. Then the existence of a human face is determined by calculating the proximity from a human face dictionary and mis-extraction due to the influence of a background and the like can be reduced by segmenting the human face. Thereby the human face can be automatically and effectively detected from the image.

In JP-A-8-77334, extraction of the feature point of a face image to be used for distinguishing each individual and group (for example, an ethnic group) is automatically and easily performed at a high speed by using a predetermined algorithm.

Incidentally, with regard to a required photo of a human face (which is a face image) for a passport, a photo ID card and the like, many photographic pose requirements are set in detail such as the size of the photo, the direction to which the human face faces, and the size and location of the human face within the photograph.

For example, not to mention the requirements for no background and no accessory such as a hat, there are detailed regulations requiring that the human face point to the front, that the human face be located in the center of photo, that the head-top of the face be located within a specific distance relative to the lower frame of the photo, and so on. In principle, a photo of a face image that is outside of the regulations is not adopted.

However, it is impractical to retake a photo simply because the size and location of the face in the photo is slightly out of regulation, although it may be rational if the human face is not facing the front or if an accessory such as a hat is worn. This causes a problem of imposing considerable labor and cost on a user.

For this reason, a method of solving the above problems has been examined by using digital image processing which has developed significantly in recent years.

For example, the following method has been examined to solve the problems. First, digital image data of a human face is directly obtained by a digital still camera or the like using an electronic image pickup device such as a CCD or a CMOS. On the other hand, the digital image data may be obtained from an analog photo (silver salt photo) of the human face by using an electronic optical image scanner. Once the digital image data is obtained, easy image processing such as zooming in/out and moving the face image are performed by using an image processing system comprising a general-purpose computer such as a PC and general-purpose software without damaging the innate characteristics of the human face.

Although it is possible to manually perform the above process by using general-purpose I/O devices such as a mouse, a keyboard and a monitor when the number of images to be processed is small, it becomes necessary to perform the process automatically by using the aforementioned conventional techniques when the number of images increases.

To realize the automation of image processing for a human face, however, it is necessary to accurately recognize a face outline, especially a head-top location of a human face, which does not necessarily generate a clear line due to a person's hairstyle, the lighting and other conditions present while taking the picture, and which cannot be accurately scanned in many cases by a conventional edge detection filter. Therefore, it is difficult to automatically recognize the head-top.

The present invention has been achieved to solve the aforementioned problems. Therefore, one object of the invention is to provide a novel head-top detecting method, a head-top detecting system and a head-top detecting program capable of detecting a head-top of a human face by accurately and quickly detecting a head-top of a human face, which is difficult to automatically detect by an edge detection technique.

SUMMARY

To solve aforementioned problems, a head-top detecting method for detecting a head-top of a human face from an image with the human face included therein according to Aspect 1 is characterized in that: after detecting a face image of an area not including the head-top of the human face and after setting a head-top detecting window with a size including the head-top of the human face at an upper part of the detected face image, an image feature quantity within the head-top detecting window is calculated in a vertical direction and a location in which the image feature quantity changes with a threshold value or more is identified as the head-top of the human face.

In the invention as described above, after selecting a part with an extremely high possibility to include the head-top of a human face by using a face detecting frame and setting the head-top detecting window at that part, the image feature quantity within the head-top detecting window is calculated. Based on the change of the image feature quantity, the head-top of a human face is detected.

In other words, since the head-top of a human face and the background thereof generally change sharply in image feature quantity, it becomes possible to easily and reliably detect the head-top which should be included in the head-top detecting window by calculating the change of the image feature quantity within the head-top detecting window.

In a head-top detecting method according to Aspect 1, a head-top detecting method according to Aspect 2 is characterized in that a luminance is used as the image feature quantity.

Since generally a face image for a facial portrait for visual identification is in a state without a hat and since a head is covered with dark-colored hair such as black or chestnut in most cases, it can be considered that there is a great difference between a luminance of a pixel in an area constituting the head and a luminance of a background. In other words, the luminance sharply changes at the border between the background and the head-top.

Therefore, when using the luminance of a pixel differing sharply according to area as the image feature quantity for identifying the head-top and the background, the head-top of a human face can be easily and reliably detected.

In a head-top detecting method according to Aspect 1, a head-top detecting method according to Aspect 3 is characterized in that a hue angle is used as the image feature quantity.

Although the Aspect 2 is achieved on the assumption that the human has dark-colored hair such as black or chestnut, there is not only dark color but also many colors that are not generated naturally and generated by the difference and change of hair color due to an ethnic group and aging and by hair coloring. Some of the colors other than dark color (for example, fair hair) have almost the same luminance as that of a background so that a sharp change cannot be obtained in the image feature quantity based on the luminance.

For this reason, a hue angle may be used as the image feature quantity in the invention. Thereby even when there is not a great difference between a luminance of a background and a luminance of a head-top, the head-top of the human face can be easily and reliably detected by calculating the change of the image feature quantity according to the difference of hue angle.

In a head-top detecting method according to one of Aspects 1 to 3, a head-top detecting method according to Aspect 4 is characterized in that an average value in a horizontal direction within the head-top detecting window is used as the image feature quantity.

Thereby, even when the feature quantity of a part of a pixel differs largely from the feature quantity of a pixel in the vicinity thereof due to noise in an image or a stain on an original image, a sharp change in the feature quantity can be prevented at the part. Therefore, the noise part and so on is not mistakenly detected as the head-top and the head-top can be detected accurately.

In a head-top detecting method according to one of Aspects 1 to 4, a head-top detecting method according to Aspect 5 is characterized in that the image feature quantity switches automatically in accordance with an image using one or both of the luminance and the hue angle.

Thereby as in Aspect 4, there can be prevented a sharp change in the feature quantity due to noise in an image or a stain on an original image and the head-top can be detected accurately.

In a head-top detecting method according to one of Aspects 1 to 5, a head-top detecting method according to Aspect 6 is characterized in that the head-top detecting window has a rectangular shape, and a width and a height of the head-top detecting window are wider than a width of the human face.

Thereby, since the head-top of the human face to be detected can be reliably captured within the head-top detecting window, the head-top can be detected more accurately.

A head-top detecting system for detecting a head-top of a human face from an image with the human face included therein according to Aspect 7 comprises: an image scanning part for scanning the image with the human face included therein; a face detecting part for detecting a face image not including the head-top of the human face from the image scanned in the image scanning part and for setting a face detecting frame in the detected area; a head-top detecting window setting part for setting a head-top detecting window with a size including the head-top of the human face at an upper part of the face detecting frame; an image feature quantity calculating part for calculating an image feature quantity in a vertical direction within the head-top detecting window; and a head-top detecting part for identifying a location in which the image feature quantity calculated in the image feature quantity calculating part changes with a threshold value or more is identified as the head-top of the human face.

Thereby, as in Aspect 1, it becomes possible to accurately and quickly detect the head-top of the human face. In addition, by realizing each part by using special hardware and a computer system, it becomes possible to detect the head-top automatically.

In a head-top detecting system according to Aspect 7, a head-top detecting system according to Aspect 8 is characterized in that the image feature quantity calculating part comprises: a luminance calculating part for calculating a luminance of each pixel as the image feature quantity; a hue angle calculating part for calculating a hue angle of each pixel as the image feature quantity; and an image feature quantity selecting part for selecting one of the image feature quantities.

Since the image feature quantity cannot be grasped accurately only by luminance or hue angle as shown in Aspects 2 and 3 in some cases, parts for calculating luminance and hue angle are provided in the invention and an optimum image feature quantity calculated by either part may be selected by the image feature quantity selecting part.

Thereby, the head-top can be detected accurately at any time by calculating an optimum image feature quantity regardless of hair color of the human face.

In a head-top detecting system according to Aspect 7 or 8, a head-top detecting system according to Aspect 9 is characterized in that the head-top detecting part comprises one or both of: a threshold value setting part for setting a threshold value of the image feature quantity; and an average value calculating part for calculating an average of the image feature quantity in a horizontal direction within the head-top detecting window.

Thereby, as in Aspect 4, even when the feature quantity of a part of a pixel differs largely from the feature quantity of a pixel in the vicinity thereof due to noise in an image or a stain on an original image, a sharp change in the feature quantity can be prevented at the part. Therefore, the noise part and so on is not mistakenly detected as the head-top and the head-top can be detected accurately.

A head-top detecting program according to Aspect 10, for detecting a head-top of a human face from an image with the human face included therein makes a computer realize: an image scanning part for scanning the image with the human face included therein; a face detecting part for detecting a face image not including the head-top from the image scanned in the image scanning part and for setting a face detecting frame in the detected area; a head-top detecting window setting part for setting a head-top detecting window with a size including the head-top of the human face at an upper part of the face detecting frame; an image feature quantity calculating part for calculating an image feature quantity in a vertical direction within the head-top detecting window; and a head-top detecting part for identifying a location in which the image feature quantity calculated in the image feature quantity calculating part changes with a threshold value or more as the head-top of the human face.

Thereby, as in Aspect 1, it becomes possible to easily and reliably detect the head-top which should be included in the head-top detecting window.

Also, since it becomes possible to realize each part in software by using a general-purpose computer system such as a PC, the part can be realized more economically and easier as compared to the method realized by creating a special apparatus. In addition, version upgrades such as a change and an improvement of the function can be easily attained only by rewriting a program in many cases.

In a head-top detecting program according to claim 10, a head-top detecting program according to claim 11 is characterized in that the image feature quantity calculating part fulfills the functions of: a luminance calculating function for calculating a luminance of each pixel as the image feature quantity; a hue angle calculating function for calculating a hue angle of each pixel as the image feature quantity; and an image feature quantity selecting function for selecting one of the image feature quantities.

Thereby, as in Aspect 8, the head-top can be detected accurately at any time by calculating an optimum image feature quantity regardless of hair color of the human face, and the same effect can be obtained as those in Aspects 1 and 9.

In a head-top detecting program according to claim 10 or 11, a head-top detecting program according to claim 12 is characterized in that the head-top detecting part comprises one or both of: a threshold value setting part for setting a threshold value of the image feature quantity; and an average value calculating part for calculating an average of the image feature quantity in a horizontal direction within the head-top detecting window.

Thereby, as in Aspect 4, even when there is noise in an image or a stain on an original image, the noise part and so on is not mistakenly detected as the head-top and the head-top can be detected accurately.

DETAILED DESCRIPTION

A best mode for carrying out the invention will be described with reference to the drawings.

Figure 1:
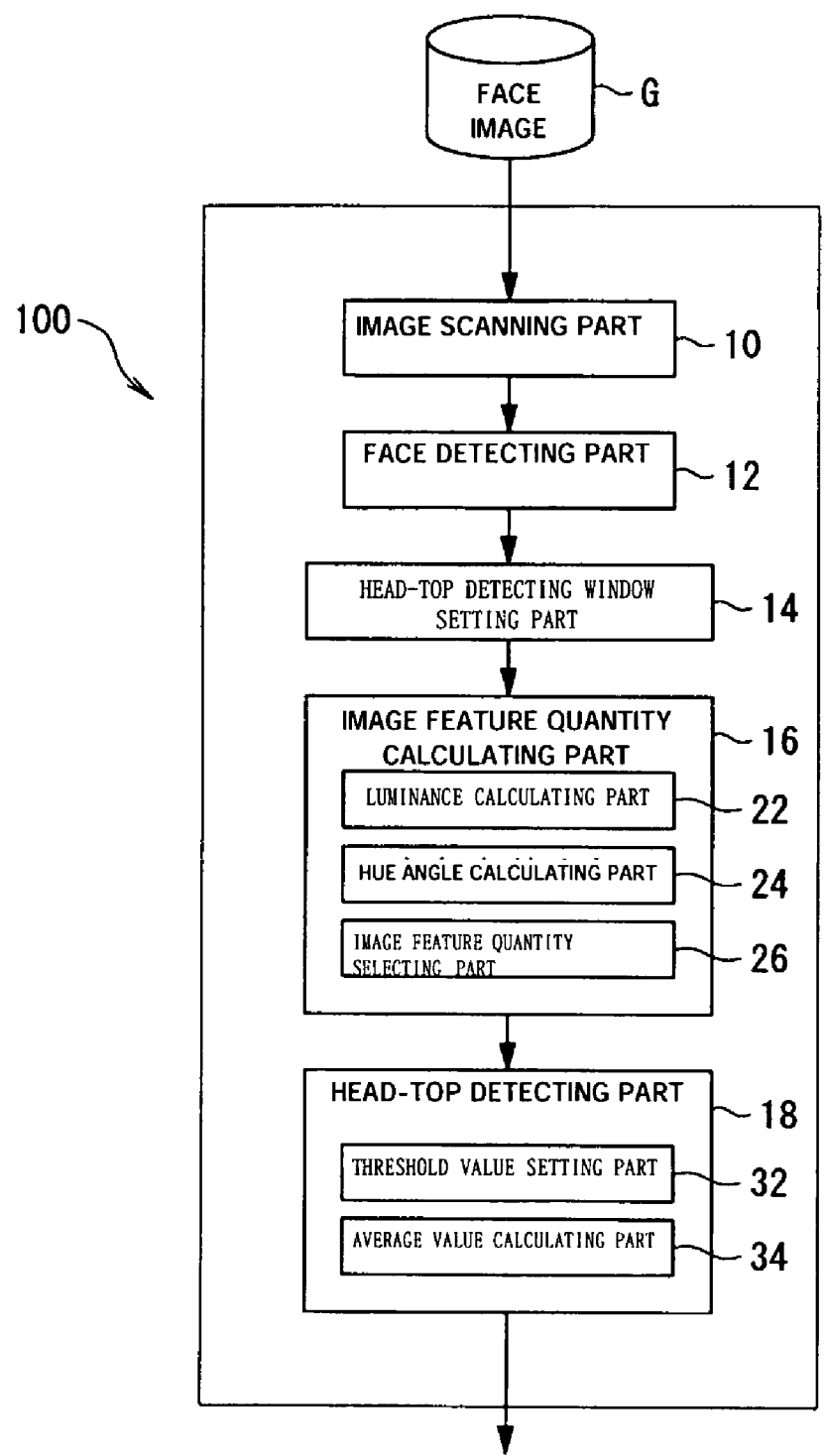
FIG. 1 is a block diagram showing one embodiment of a head-top detecting system.

FIG. 1 shows one embodiment of a head-top detecting system 100 for a human face according to the invention.

As shown in this Figure, the head-top detecting system 100 comprises: an image scanning part 10 for scanning an image with the human face included therein such as a face image for a facial portrait for visual identification as mentioned above; a face detecting part 12 for detecting the human face from the image scanned in the image scanning part 10 and for setting a face detecting frame at the detected part; a head-top detecting window setting part 14 for setting a head-top detecting window W with a size including the head-top of the human face at an upper part of the face detecting frame; an image feature quantity calculating part 16 for calculating image feature quantity within the head-top detecting window W; and a head-top detecting part 18 for detecting the head-top of the human face based on the change of the image feature quantity calculated in the image feature quantity calculating part 16.

First, the image scanning part 10 provides a function of obtaining a facial portrait for visual identification, for example, to be attached to a public ID such as a passport and a driver's license or to be attached to a private ID such as an employee ID card, a student ID card and a membership card, in other words, obtaining the face image G without a hat, without background scenery and includes largely the human face facing to the front as digital image data including each pixel data of R (red), G (green) and B (blue) by using an image pickup sensor such as a CCD (Charge Coupled Device) or a CMOS (Complementary Metal Oxide Semiconductor).

More specifically, the CCD of a digital still camera and of a digital video camera, a CMOS camera, a vidicon camera, an image scanner, a drum scanner and so on may be used. There is provided a function of analog to digital (A/D) converting the face image G optically scanned in the image pickup sensor and sequentially sending the digital image data to the face detecting part 12.

In addition, the image scanning part 10 has a data storing function in which the scanned face image data can be properly stored in a storage device such as a hard disk drive (HDD) and in a storage medium such as a DVD-ROM. When the face image is supplied as digital image data through a network and a storage medium, the image scanning part 10 becomes unnecessary or it functions as a communication part or an interface (I/F).

Next, the face detecting part 12 provides a function of detecting the human face from the face image G scanned in the image scanning part 10 and setting the face detecting frame F at the detected part.

This face detecting frame F has a rectangular shape with an area smaller than the area of a human face facing to the front and has a size (an area) including at least both eyes and the lips of the human face with the nose centered but not including the head-top of the human face, which will be described later.

In addition, although a detection algorithm for the human face by the face detecting part 12 is not especially limited, a conventional method can be utilized as described in the following document, for example:

H. A. Rowley, S. Baluja and T. Kanade,
"Neural network-based face detection"
IEEE Transactions on Pattern Analysis and Machine Intelligence, vol. 20, no. 1, pp. 23-38, 1998.

According to the technology described in this document, creating a face image of an area including both eyes and the lips of the human face but not including the head-top, and training a neural network by using this image, the human face is detected by using the trained neural network. According to the disclosed technology mentioned above, the area from both eyes to the lips is detected as a face image area.

The size of the face detecting frame F is not unchangeable and can increase and decrease depending on the size of a target face image. The head-top detecting window setting part 14 provides a function of setting the head-top detecting window W with a size including the head-top of the human face at an upper part of the face detecting frame F set in the face detecting part 12. In other words, there is selected a target area for accurately detecting the head-top of the human face in the following parts from the face image G by using the head-top detecting window W.

The image feature quantity calculating part 16 comprises: a luminance calculating part 22 for calculating a luminance of each pixel as the image feature quantity; a hue angle calculating part 24 for calculating a hue angle of each pixel as the image feature quantity; and an image feature quantity selecting part 26 for selecting one of these image feature quantities in accordance with the change of the feature quantity.

In the image feature quantity calculating part 16, as will be described later, the image feature quantity selecting part 26 selects an optimum image feature quantity either based on the luminance calculated in the luminance calculating part 22 or based on the hue angle calculated in the hue angle calculating part 24. The information on the selected image feature quantity is sent to the head-top detecting part 18.

The head-top detecting part 18 comprises: a threshold value setting part 32 for setting a threshold value of the image feature quantity; and an average value calculating part 34 for calculating an average of the image feature quantity in a horizontal direction within the head-top detecting window W. The head-top and the background are divided based on the threshold value set in the threshold value setting part 32, and the average value calculating part 34 calculates an average of the image feature quantity in a horizontal direction within the head-top detecting window W. Thereby, a local error of the image feature quantity due to noise or a stain on an image can be prevented.

Figure 3:
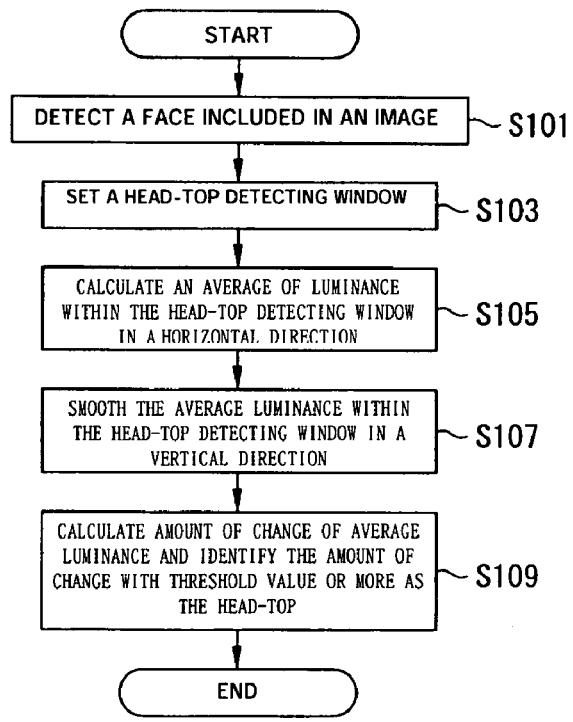
FIG. 3 is a flowchart showing one embodiment of a head-top detecting method.

In addition, each of the parts 10, 12, 14, 16, 18, 22, 24, 26 and so on configuring the head-top detecting system 100 is actually realized by a computer system such as a PC which is configured by hardware in the form of a CPU, a RAM and so on and which is configured by a special computer program (software) shown in FIG. 3.

Figure 2:
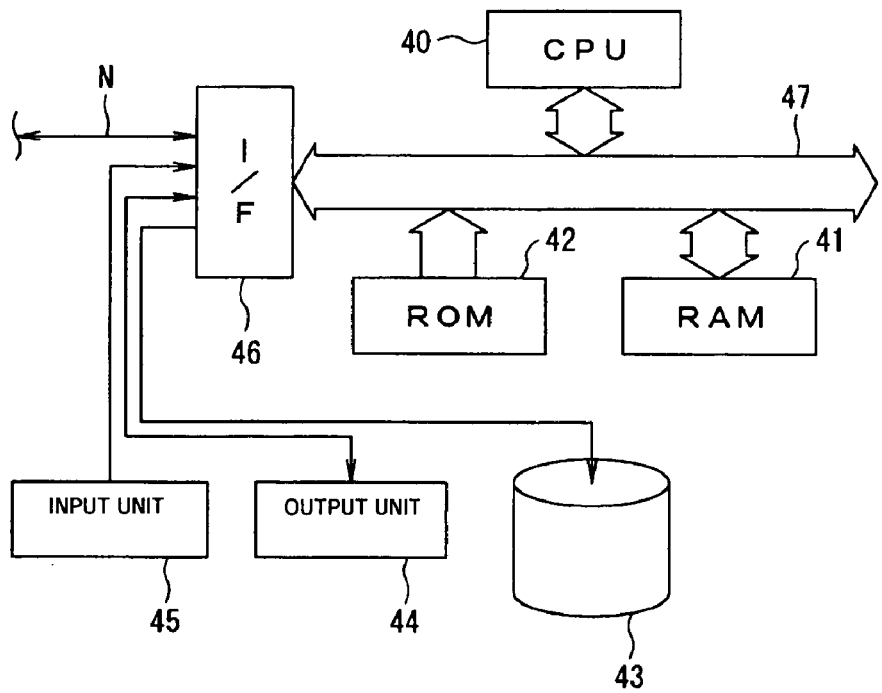
FIG. 2 is a block diagram showing hardware configuring the head-top detecting system.

In the hardware for realizing the head-top detecting system 100 as shown in FIG. 2, for example, through various internal/external buses 47 such as a processor bus, a memory bus, a system bus and an I/O bus which are configured by a PCI (Peripheral Component Interconnect) bus, an ISA (Industrial Standard Architecture) bus and so on, are bus-connected to each other: a CPU (Central Processing Unit) 40 for performing various controls and arithmetic processing; a RAM (Random Access Memory) 41 used for a main storage; a ROM (Read Only Memory) 42 which is a read-only storage device; a secondary storage 43 such as a hard disk drive (HDD) and a semiconductor memory; an output unit 44 configured by a monitor (an LCD (liquid crystal display) and a CRT (cathode-ray tube)) and so on; an input unit 45 configured by an image pickup sensor and so on such as an image scanner, a keyboard, a mouse, a CCD (Charge Coupled Device) and a CMOS (Complementary Metal Oxide Semiconductor); an I/O interface (I/F) 46; and so on.

Then, for example, various control programs and data that are supplied through a storage medium such as a CD-ROM, a DVD-ROM and a flexible (floppy) disk (FD) and through a communication network (LAN, WAN, Internet and so on) N are installed on the secondary storage 43 and so on. At the same time, the programs and data are loaded onto the main storage 41 if necessary. According to the programs loaded onto the main storage 41, the CPU 40 performs a specific control and arithmetic processing by using various resources. The processing result (processing data) is output to the output unit 44 through the bus 47 and displayed. The data is properly stored and saved (updated) in the database created by the secondary storage 43 if necessary.

A description will now be given about an example of a head-top detecting method using the head-top detecting system 100 having such a configuration with reference to FIGS. 3-9.

FIG. 3 is a flowchart showing an example of a head-top detecting method for the face image G to be actually detected.

As shown in this Figure, after the face detecting part 12 detects in the first step S101 a face included in the face image G from the face image G which has been scanned in the image scanning part 10 and from which the head-top will be detected, the face detecting frame F is set to the detected human face.

Figure 4:
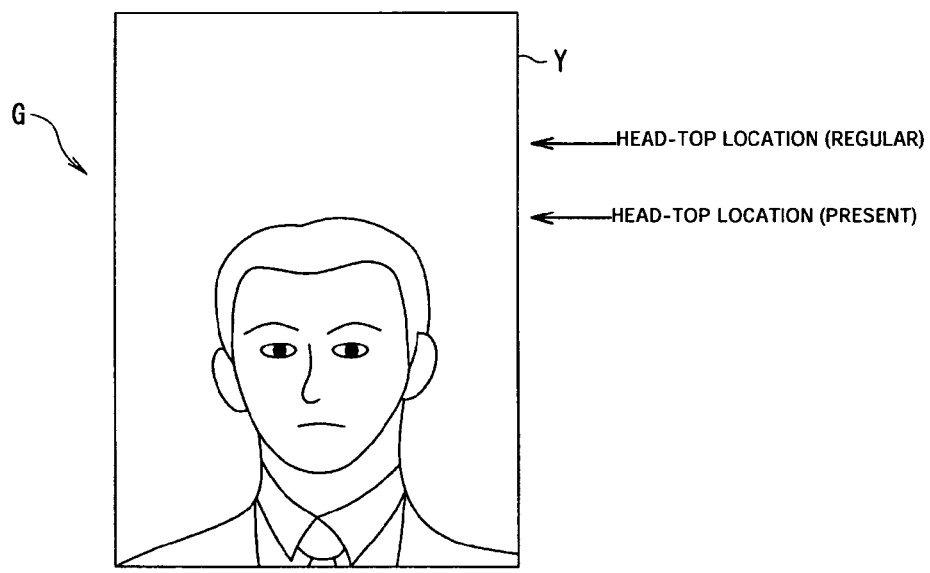
FIG. 4 is a view showing the face image from which the head-top will be detected.
Figure 5:
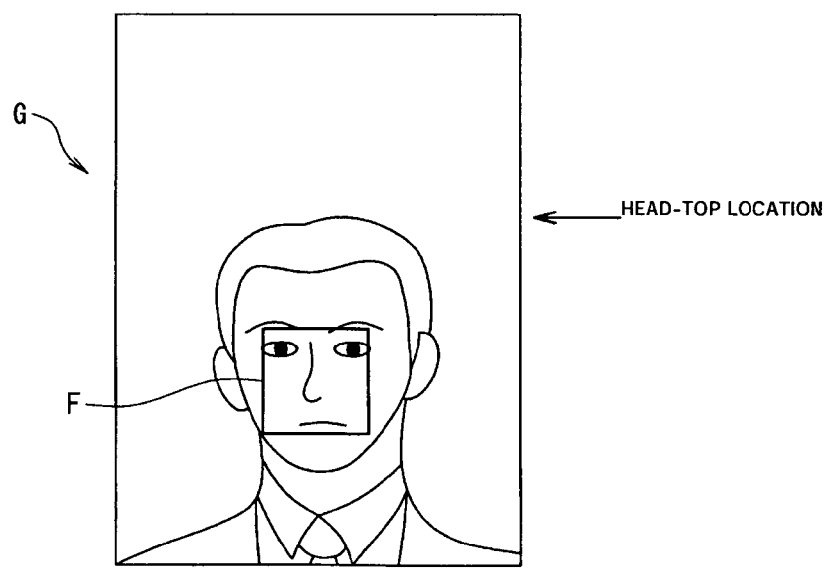
FIG. 5 is a view showing the state in which a face detecting frame is set at the face image.

For example, since the face image G from which the head-top will be detected in the invention is limited to the image of one human face as shown in FIG. 4, the location of the human face is first specified by the face detecting part 12 and then the rectangular-shaped face detecting frame F is set on the human face area as shown in FIG. 5.

In the case of the face detecting frame F as shown in the Figure, although the face detecting frame F has a rectangular shape with an area smaller than the area of a human face and has a size (an area) not including the head-top, the size and shape are not limited to those exemplified if the area does not include the head-top of the human face. Also, although the human face size and the location of a display frame Y in a horizontal direction are within the regulations with regard to each face image G shown in FIGS. 4-7(*a*), the head-top of the human face is located too low and is out of regulation.

Figure 6:
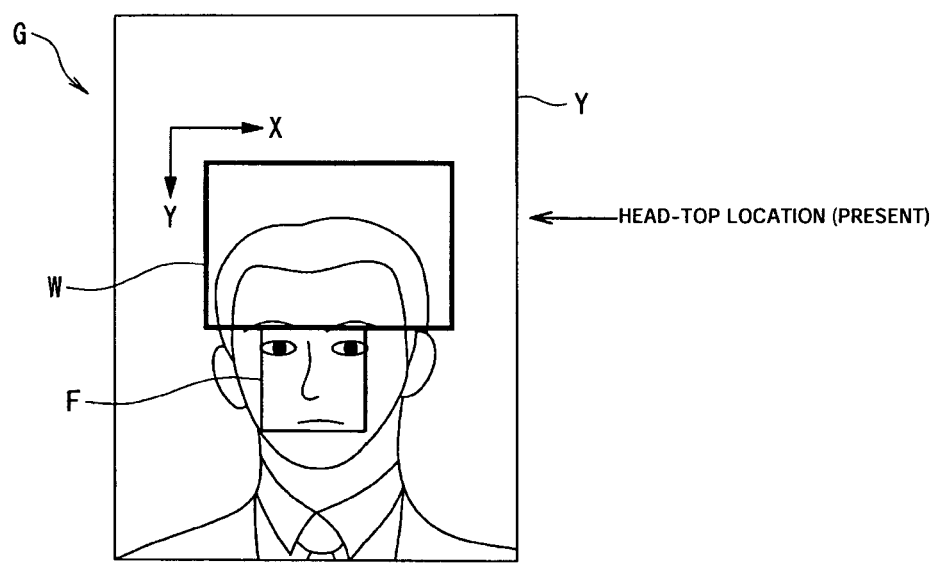
FIG. 6 is a view showing the state in which a head-top detecting window is set at the upper part of face detecting frame.
Figure 7:
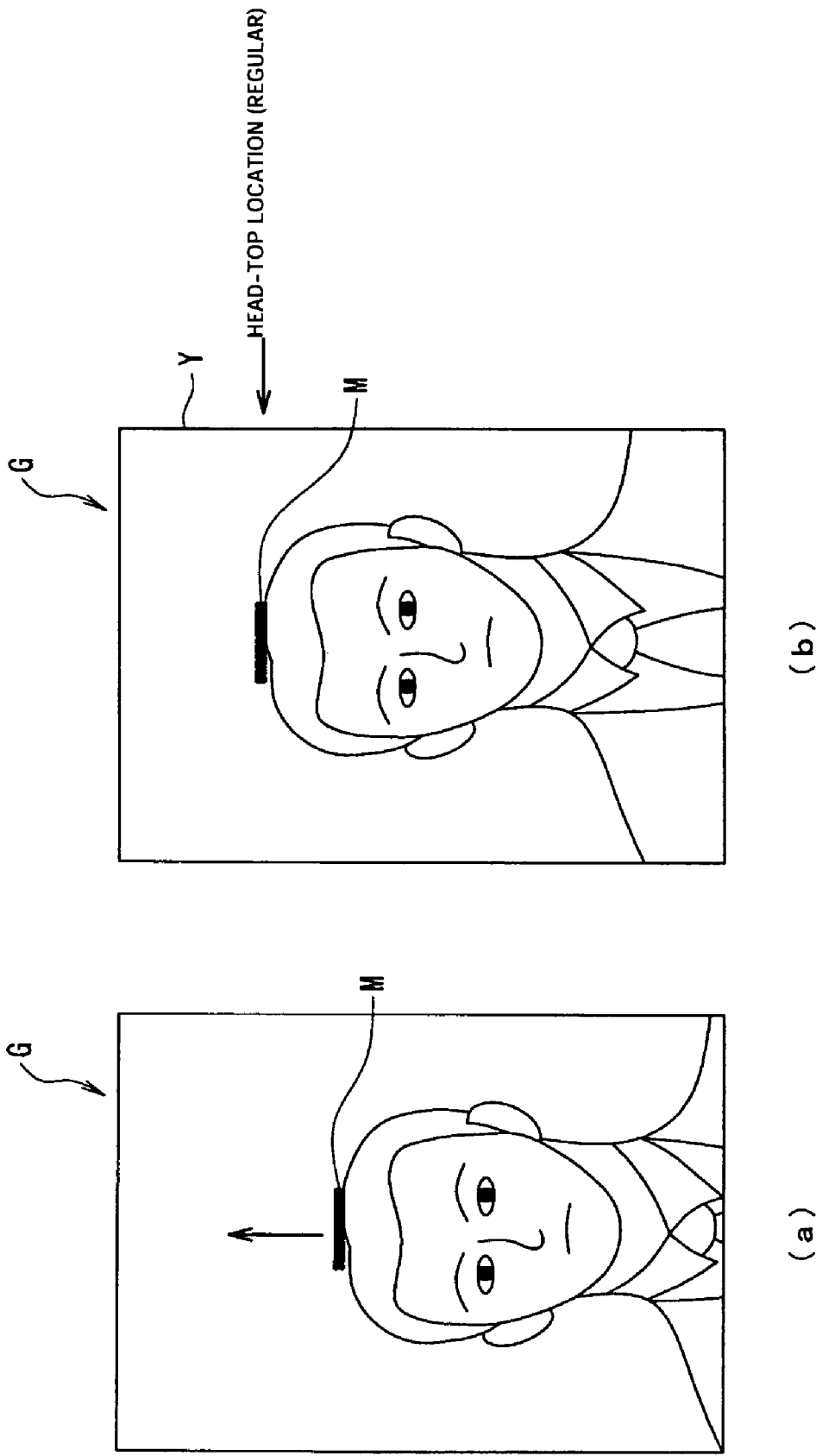
FIGS. 7(a) and 7(b) are views showing the state in which the head-top is detected and the location is modified.

Next, when the face detecting frame F has been set at the center of the human face through the above process, moving to step S103 the head-top detecting window setting part 14 sets the head-top detecting window W having a rectangular shape at the upper end part of the face detecting frame F as shown in FIG. 6, and the head-top area of the human face is specified.

The size and shape of the head-top detecting window W are not strictly limited. If the head-top detecting window W includes the head-top which is located above a forehead of the human face and which is the border between the background and the head-top without fail, the size and shape are not especially limited. However, when the head-top detecting window W is too large, the time to detect the edge increases. When the head-top detecting window W is too small, the head-top to be detected may not be included in some cases. Therefore, when using the head-top detecting window having a rectangular shape with the width and height being wider than a width of the human face as shown in this Figure, it is conceivable that the head-top can be reliably captured while eliminating an unnecessary part. Although the head-top detecting window W is set by contacting the upper end of the face detecting frame F in the example of FIG. 6, the head-top detecting window W does not always have to contact the face detecting frame F. It suffices that a specific positional relationship can be kept between the face detecting frame F and the head-top detecting window W.

Next, when the head-top detecting window W has been set to a target image, the process moves to step S105 and calculates the luminance of each pixel within the head-top detecting window W, and an average of the luminance in a horizontal direction (X-direction in FIG. 6) is calculated in each line.

For example, when the number of pixels within the head-top detecting window W is set at "150 (pixel)" (horizontal direction, X-direction in FIG. 6)×"100 (pixel)" (vertical direction, Y-direction in FIG. 6)=15000 (pixel), the average of the luminance in each line can be calculated by adding the luminance values of all the pixels in each line and dividing the sum by 150. The average luminance is identified as the image feature quantity in each line.

The reason for identifying the average luminance in each line as the image feature quantity in each line is, as described above, to prevent an influence caused by the change of luminance due to noise in the face image G and so on. In other words, although the luminance of the pixels of the part where noise or a stain are present on the face image G to be detected differs largely from a luminance of pixels in the vicinity thereof, the part can be prevented from being mistakenly detected as the head-top, by calculating the average of the luminance in each line and adopting the average as the image feature quantity in each line.

Next, when the average luminance (image feature quantity) in each line within the head-top detecting window W has been calculated in such a manner, after moving to step S107 and smoothing the average luminance in each line in a vertical direction (Y-direction in Figure), a sharp change in image feature quantity due to noise in an image or a stain on an original image is prevented similar to the aforementioned case. Although the method of smoothing is not especially limited, it is appropriate to use an average luminance value in the first to third lines or so from above and below a target line in a vertical direction.

Next, when the average luminance in each line has been calculated, after moving to step S109 and sequentially plotting the calculated average luminance in each line from the upper end of the head-top detecting window W vertically downward (Y-direction), the amount of change is obtained. The location in which the amount of change is equal to or greater than a threshold value is identified as the head-top.

Figure 8:
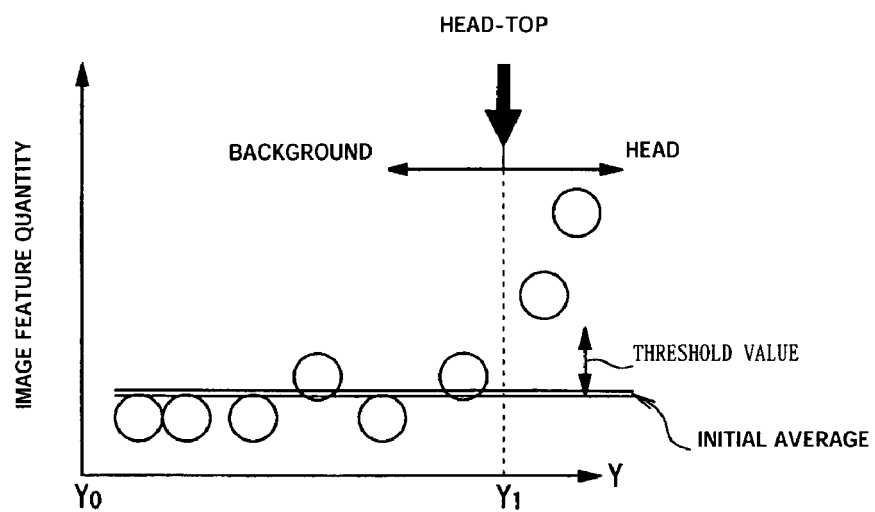
FIG. 8 is a view showing a relation between the image feature quantity and the amount of change.

For example, as shown in FIG. 8, plotting the image feature quantity constituted by the calculated average luminance in each line vertically (Y-direction) within the head-top detecting window W, the location in which the amount of change is the threshold value (for example, 10% of the average of the image feature quantity) or more above an initial average is identified as the head-top.

The initial average value used here is the average of the image feature quantity in a line near an upper base of the head-top detecting window (for example, six lines or so).

In the case of FIG. 8, from the fact that the image feature quantity exceeds threshold value near $Y_1$, the location of $Y_1$ can be identified as the head-top, between $Y_0$ and $Y_1$ as the background and the part exceeding $Y_1$ as the head.

In addition, the reason for identifying the location in which the amount of change is the threshold value or more as the head-top is, as mentioned above, that some differences are generated in the image feature quantity due to noise or a stain on the face image G even when the background is uniform, and therefore to prevent mistakenly detecting due to the differences. In the case of the face image G and the like with rare differences in the image feature quantity due to noise or a stain, the threshold value may be small. In the case of the face image G and the like with many noises and stains, the threshold value should be large in some cases.

Figure 9:
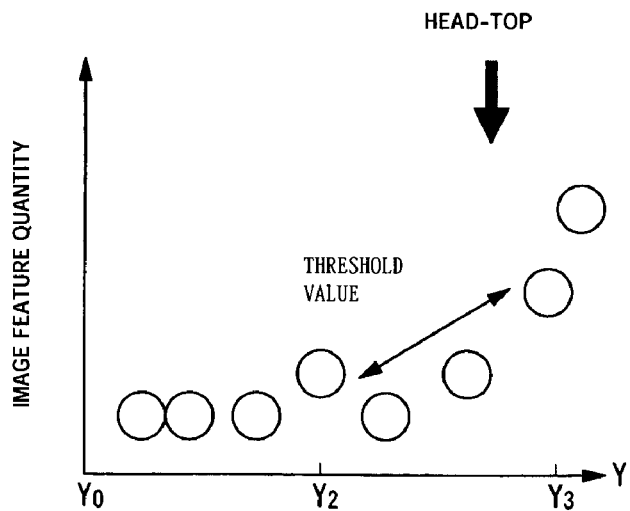
FIG. 9 is a view showing a relation between the image feature quantity and the amount of change.

Although, in the case of FIG. 8, the initial average of the image feature quantity is set and the threshold value is set based on the initial average, each image feature quantity located slightly apart is compared and the distance thereof may be set as the threshold value as shown in FIG. 9. In the example of FIG. 9, since the distance exceeds the threshold value when comparing the image feature quantity of the Y2 location with the image feature quantity of the Y3 location, the part in the vicinity of Y3 is identified as the head-top.

When the head-top has been thus detected, the entire human face will be moved so that the head-top may be located at the same location as the regulation head-top location in height, as shown in FIGS. 7(a) and 7(b).

In FIG. 7(a), since the head-top of the human face is located quite low, the head-top can be located at the regulation location by moving the human face vertically upward as shown in FIG. 7(b). Although the image ends at the neck of the human as shown in FIG. 7(a) and so on, the image under the neck is assumed to exist actually as it is. As a result of moving the human face as shown in FIG. 7(b), a blank area is not inconveniently generated within the display frame Y.

On the other hand, although the average luminance in each line is adopted as the image feature quantity in the embodiment described above, no large change is generated between the background and the head-top in luminance, and the amount of change of the image feature quantity does not exceed the threshold value near the head-top in some cases in accordance with hair color, lighting conditions and so on.

For this reason, when no large change in luminance is generated, the head-top of a human can be accurately detected by using hue angle instead of the luminance as image feature quantity.

Figure 10:
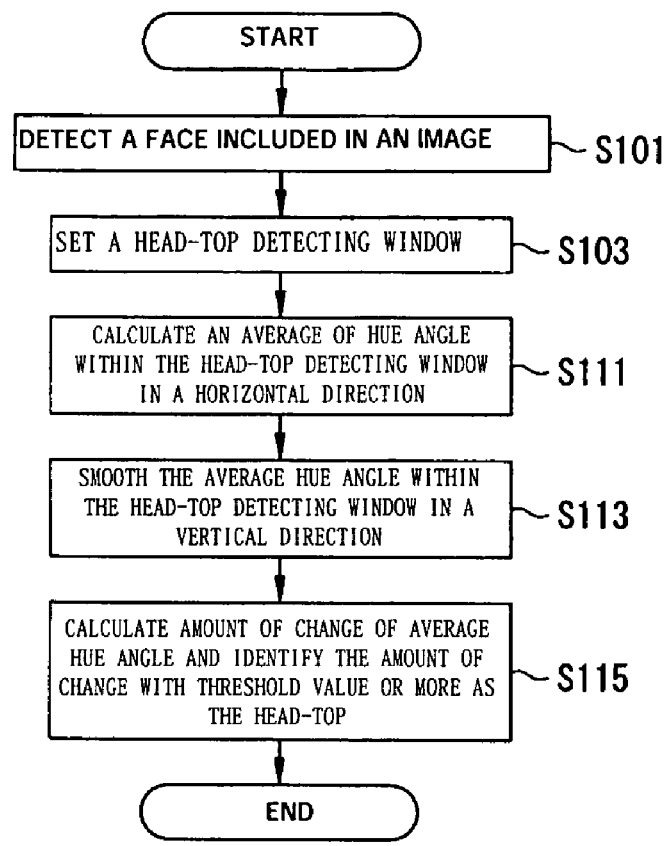
FIG. 10 is a flowchart showing another embodiment of a head-top detecting method.

FIG. 10 shows a flowchart for detecting a head-top when using hue angle as the image feature quantity. In the steps S101 and S103, as the case of adopting luminance, after detecting the face and setting the head-top detecting window at the head-top, an average of hue angle of the detecting window in a horizontal direction is calculated (step S111). Smoothing the average hue angle in a vertical direction within the detecting window (step S113), and calculating the amount of change in conclusion, the location thereof is identified as the head-top when the amount of change is a threshold value or more (step S115).

Thereby, even in the case where the head-top of a human cannot be detected by using the image feature quantity based on luminance, the head-top of a human can be accurately detected.

It should be noted that "luminance" and "hue angle" used herein have the same meaning as generally defined in the field of image processing.

Also, "hue" means an attribute showing a difference of color, and "hue angle" means an angle from a background color as a standard to a hair color using a "Munsell hue circle" and a "Munsell color solid". For example, according to the "Munsell hue circle", when the background color as a standard is "Blue", the hue angle is larger (image feature quantity is larger) with the hair color being "Yellow" and "Red" than being "Green".

Figure 11:
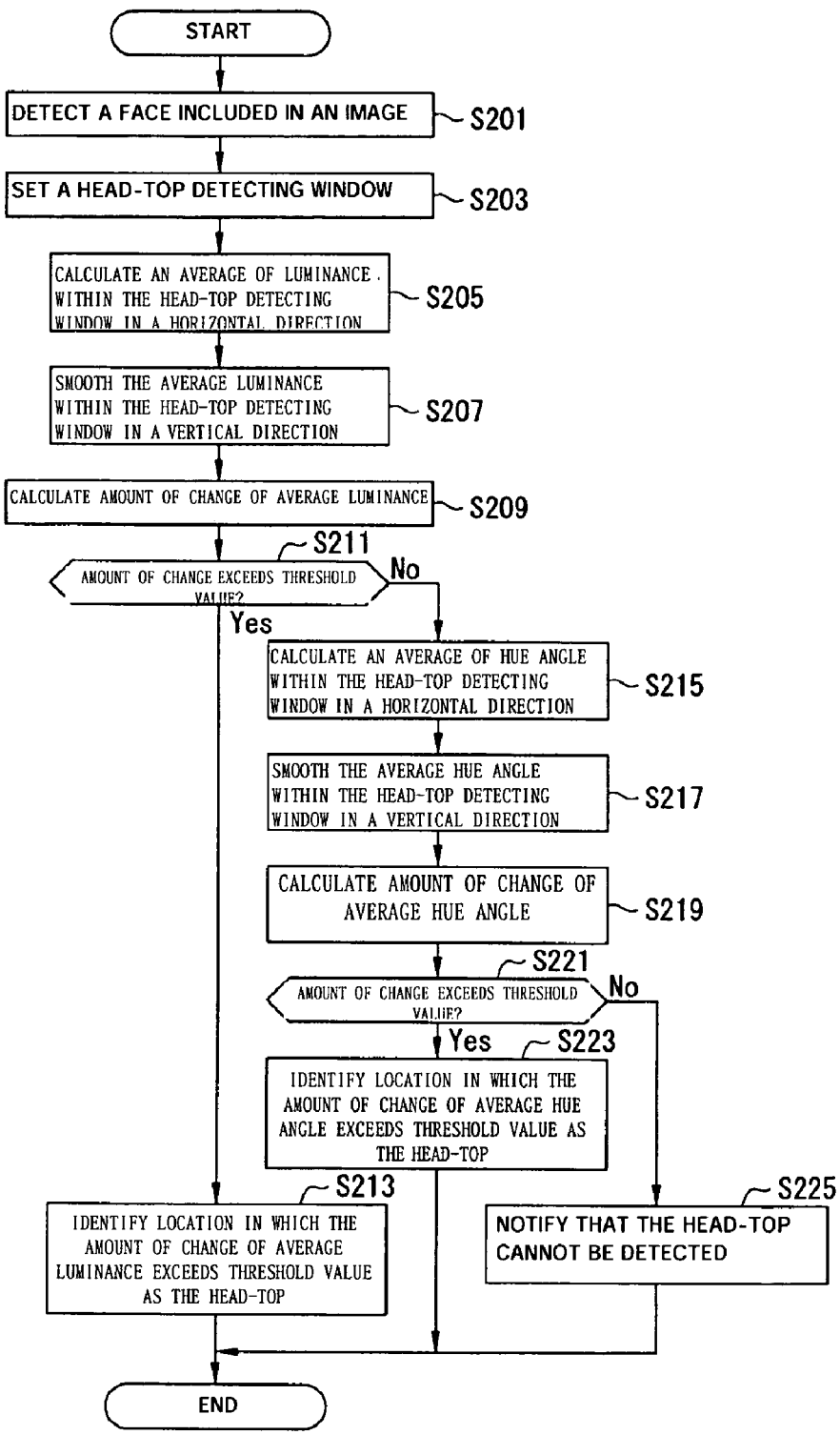
FIG. 11 is a flowchart showing another embodiment of a head-top detecting method.

FIG. 11 shows a flow of processes in the aforementioned image feature quantity selecting part 26 and the head-top detecting part 34, that is, FIG. 11 shows an example of a flowchart for detecting a head-top considering the case where the head-top of the human cannot be detected by using the image feature quantity based on luminance.

In the flow of detecting a head-top, as the flow shown in FIG. 3, after detecting a human face included in an image, setting the head-top detecting window W and calculating an average of luminance in a horizontal direction within the detecting window, the average luminance is smoothed in a vertical direction and the amount of change of the average luminance is calculated (steps S201-S209).

Then determining whether the amount of change exceeds the threshold value or not in the next step S211 and being judged to exceed (yes), the process moves to step S213, the location in which the amount of change of the average luminance exceeds the threshold value is identified as the head-top, and then the process ends. In the case of being judged that the amount of change does not exceed the threshold value (No), the process moves to step S215 and the amount of change of the image feature quantity is calculated based on hue angle as shown in FIG. 10 (steps S215-S219). After that, moving to step S221 and being judged that the amount of change exceeds the threshold value (yes), the process moves to step S223, the location in which the amount of change of the average luminance exceeds the threshold value is identified as the head-top, and then the process ends. In the case of being judged that the amount of change does not exceed the threshold value (No), the process moves to step S225, a user and the like of this system will be notified (or see a display) that "the head-top cannot be detected", and then the process ends.

As the case of reaching step S225, it is conceivable that there is a case where the luminance and hue angle of hair (head-top area) have the almost same value as that of a background, for example, where the background and the hair are colored blue and the color saturation thereof are almost same, and other cases. In such a case, however, it may be difficult even for the high sensitivity of human vision to detect the head-top, and the case is extremely rare in which a photographer may try consciously avoiding photographing and so on.

Therefore, the head-top of the human can be accurately detected by adopting one or both of the average luminance and the average hue angle.

In addition, although the image feature quantity based on hue angle is calculated after calculating the image feature quantity based on luminance in FIG. 11, the image feature quantity based on luminance may be calculated after calculating the image feature quantity based on hue angle. Further, both image feature quantities may be used together.

In addition, the change of luminance is frequently used as an image feature quantity in other image processing technologies and so on since the change of luminance is easily visually recognized.

What is claimed is:

1. A head-top detecting method for detecting a head-top of a human face from an image with the human face included therein, the method comprising:
    obtaining the image with the human face without background scenery and without a hat and with the human face facing a front of the image;
    detecting a face image of an area excluding the head-top of the human face;
    setting a head-top detecting window with a size including the head-top of the human face at an upper part of the detected face image;
    calculating an average luminance for each horizontal line of a plurality of horizontal lines within the head-top detecting window, sequentially plotting the average luminance for each horizontal line in a vertically downward direction from a top of the head-top detecting window, and identifying a horizontal line in which the average luminance exceeds a predetermined luminance threshold value as a location of the head-top of the human face;
    calculating an average hue angle for each horizontal line of the plurality of horizontal lines within the head-top detecting window when the average luminance for each horizontal line of the plurality of horizontal lines does not exceed the predetermined luminance threshold value, sequentially plotting the average hue angle for each horizontal line in the vertically downward direction from the top of the head-top detecting window, and identifying a horizontal line in which the average hue angle exceeds a predetermined hue angle threshold value as the location of the head-top of the human face.

2. A head-top detecting method according to claim 1 wherein the head-top detecting window has a rectangular shape, and a width and a height of the head-top detecting window are wider than a width of the human face.

3. A head-top detecting system for detecting a head-top of a human face from an image with the human face included therein comprising:
    an image scanning part for scanning the image with the human face without background scenery and without a hat included therein, and with the human face facing a front of the image;
    a face detecting part for detecting a face image excluding the head-top of the human face from the image scanned in the image scanning part and for setting a face detecting frame in the detected area;
    a head-top detecting window setting part for setting a head-top detecting window with a size including the head-top of the human face at an upper part of the face detecting frame;
    an image feature quantity calculating part having a luminance calculating part for calculating a luminance of each pixel within the head-top detecting window and a hue angle calculating part for calculating a hue angle of each pixel within the head-top detecting window; and
    a head-top detecting part for calculating an average luminance for each horizontal line of a plurality of horizontal lines within the head-top detecting window, sequentially plotting the average luminance for each horizontal line in a vertically downward direction from a top of the head-top detecting window and identifying a horizontal line in which the average luminance exceeds a predetermined luminance threshold value as a location of the head-top of the human face, and for calculating an average hue angle for each horizontal line of the plurality of horizontal lines within the head-top detecting window when the average luminance for each horizontal line of the plurality of horizontal lines does not exceed the predetermined luminance threshold value, sequentially plotting the average hue angle for each horizontal line in the vertically downward direction from the top of the head-top detecting window, and identifying a horizontal line in which the average hue angle exceeds a predetermined hue angle threshold value as the location of the head-top of the human face.

* * * * *